United States Patent [19]

Vance et al.

[11] Patent Number: 5,067,825

[45] Date of Patent: Nov. 26, 1991

[54] AIRCRAFT ENGINE ROTOR SQUEEZE FILM DAMPER

[76] Inventors: John M. Vance, 2908 Chaparral; Luis A. San Andres, 3706A Plainsman Ln., both of, Bryan, Tex. 77802

[21] Appl. No.: 539,490

[22] Filed: Jun. 18, 1990

[51] Int. Cl.$^5$ .............................................. F16C 32/06
[52] U.S. Cl. .................................................... 384/99
[58] Field of Search .................. 384/99, 581, 535, 558, 384/495

[56] References Cited

U.S. PATENT DOCUMENTS

| | | |
|---|---|---|
| 1,313,905 | 8/1919 | Mummert . |
| 1,378,894 | 5/1921 | Norman . |
| 1,425,641 | 8/1922 | Gough . |
| 1,492,397 | 4/1924 | Roberts . |
| 1,737,302 | 11/1929 | Ellis . |
| 2,297,112 | 9/1942 | Phillips . |
| 3,563,140 | 2/1971 | Hollingsworth . |
| 4,669,369 | 6/1987 | Holt et al. . |
| 4,669,893 | 6/1987 | Chalaire et al. ........................ 384/99 |
| 4,867,655 | 9/1989 | Barbic et al. ........................... 384/99 |
| 4,872,767 | 10/1989 | Knapp ................................... 384/99 |

*Primary Examiner*—Lenard A. Footland
*Attorney, Agent, or Firm*—Jerome C. Squillaro

[57] ABSTRACT

An aircraft engine rotor system is provided with a squeeze film damper mechanism that allows axial flow of lubricant in a squeeze film region without creating a gross circumferential distortion of pressure around the damper journal. The outer race of a rolling-element bearing assembly which assembly is disposed in a journal bearing enclosure, is provided with a number of encircling annular slots, these slots providing space for reception of a spaced pair of serrated rings which are fixed to an inner wall surface of the journal bearing enclosure, the serrated peripheries of the rings being in contact with the bearing journal enclosure inner wall space. Oil enters the squeeze film region through the serrations in one of the rings and outflows through those in the other ring. The outer race of the rolling-element bearing assembly preferably is pinned or otherwise prevented from rotating so that it will orbit in translating movement in the same manner as the rotor shaft which is received in the inner race companion to the outer race. During orbiting movement of the assembly, the fixed position rings are unaffected by that movement since the outer race continuous slots are deep enough to allow the assembly to orbitally move relative to the fixed rings (alternatively, the deep slots could be in the bearing assembly with the rings fixed to the journal). The rings can have less clearance in the slots than conventional rings and this contributes to maintanance of large pressures in the squeeze film region since oil flow from one end of the squeeze film region to the other is not around the rings whereat pressure distortions can occur, but rather through the serrations.

12 Claims, 2 Drawing Sheets

AIRCRAFT ENGINE ROTOR SQUEEZE FILM DAMPER

BACKGROUND OF THE INVENTION

1. Field of the Invention

The present invention relates to aircraft engine rotor systems and, more particularly, to squeeze film damper feed and seal mechanisms as embodied in such systems.

2. Description of the Prior Art

Aircraft turbine engines when rotating in a hydrodynamic support bearing do not rotate on a fixed centerline as, e.g., an axis coincident with a centerline of a supporting journal bearing. Rather, the rotor shaft describes an orbital movement defined by two-dimensional translating movement of the rotor shaft, the orbit being a trace of eccentric movement of the rotor shaft center about the fixed journal bearing center, this orbital movement being duplicated in rolling-element bearings in which the rotor is received. The properly designed squeeze-film damper is capable of dissipating large vibrational energy at the support, thus preventing unacceptable build-up of engine loads and displacements.

A conventional squeeze film damper can be defined between an inner surface of a cylindrical journal bearing enclosure and the outer race of a rolling-element bearing assembly in which the rotor is received, roller bearings being used almost exclusively in such assemblies. The squeeze film region further can be defined by spaced apart end seals, these end seals most usually being conventional piston type ring end seals. Oil is fed into the squeeze-film region, typically through oil feed holes located at the mid-land location on the bearing enclosure (housing), and leakage paths generally exist at the interface between the seals and the housing and/or journal, and at piston ring gap (split). In some cases, housing leakage holes are placed close to the seals to ensure through-flow. The squeeze film functions to develop force equal to the imposed rotor shaft loading. The quadrature (tangential) component of this force provides damping and the radial component provides a restoring of stiffness force for rotor support. Through oil flow in the squeeze-film damper there is provided a means to transfer the heat energy generated by the squeeze-film action out of the squeeze-film region and thus prevent unacceptable temperature increase.

Conventional squeeze film dampers have a number of drawbacks. Oil feed holes into the damper create undesirable distortions of the squeeze film pressure field. This reduces the overall damper effective force, its ability to provide continuous damping, and degrades the dynamic performance of an engine rotor system. Furthermore, prediction of squeeze film forces is not reliable due to complexities of the distorted pressure field. Also and because conventional piston ring end seals with large clearances are used thereby allowing large oil flow rates, damper performance is degraded because the pressure field is locally distorted and reduced especially at the outflow end of the squeeze film region.

SUMMARY OF THE INVENTION

Accordingly, it is an object of the invention to provide a squeeze film damper feed and seal mechanism which overcomes the drawbacks of the prior art.

It is a further object of the invention to provide a squeeze film feed and seal mechanism for embodiment in an aircraft engine rotor system which enhances squeeze film performance in damping vibratory energy.

It is a still further object of the invention to provide a squeeze film damper feed and seal mechanism which insures more uniform pressure conditions throughout the squeeze film region and avoidance of any gross pressure distortions therein which could degrade damper performance and that of the rotor system as well.

Briefly stated, there is provided a squeeze film damper and seal mechanism for an aircraft rotor system which allows axial flow of a lubricant in a squeeze film region without creating a gross circumferential distortion of pressure around a damper journal. A rolling-element bearing assembly is disposed in an enclosure such as a bearing journal and during aircraft engine operation, the rotor received in an inner race of the assembly along with the roller-element bearing assembly orbits in two-dimensional translating movement, such movement creating vibratory energy which must be damped by the mechanism. The journal bearing enclosure has an inner encircling wall surface and a pair of spaced apart, serrated periphery rings are fixed at their peripheries to the said inner wall surface. The bearing assembly includes in addition to the inner race, an outer race and roller bearing elements. The squeeze film region is defined by the enclosure inner wall space and the exterior of the outer race as same are situate between the axially spaced pair of serrated rings. Oil enters the squeeze film region through the serrations in one ring and outflows through those in the other. The rings locate in associated continuous encircling slots formed in the outer race so that as the bearing assembly and rotor orbit, the slots being deeper than the rings are thick so as to accommodate this orbiting motion without affecting the fixed positioning of the rings to the inner wall surface. The rings have less side clearance in the slots than conventional rings since oil flow in the axial direction in the squeeze film region need not be as a bypass around the rings, but rather takes place as direct flow through the ring serrations.

In accordance with these and other objects of the invention, there is provided an aircraft engine rotor system including an enclosure having an inner encircling wall surface, and a rolling-element bearing assembly receiving an aircraft rotor shaft disposed in the enclosure, said rolling-element bearing assembly along with the rotor shaft, orbitally translating within said enclosure, said enclosure having at least one oil inlet therein for admitting an oil flow interiorly of said enclosure for establishment of a squeeze film intervening said rolling-element bearing assembly and the enclosure inner wall surface, there being a squeeze film damper feed and seal mechanism comprising a pair of rings engaged with the inner surface of said enclosure and encircling said rolling-element bearing assembly, said rings being spaced one from the other a distance to define a squeeze film region therebetween at the outer peripheral surface of said roller-element bearing assembly, one of said rings being located adjacent the enclosure oil inlet, there further being an end seal encircling said rolling-element bearing assembly and spaced from said one ring such that the enclosure oil inlet is intermediate said one ring and said end seal, space between said one ring and said end seal comprising an oil feed chamber, said one ring having a plurality of recesses formed at the periphery thereof for communicating an oil flow from the feed chamber into the squeeze film region, the other one of said pair of rings having a plurality of recesses formed at the periphery thereof whereby oil in the squeeze film region can outflow therefrom to an oil outlet, said rolling-element bearing assembly having continuous slots extending around the periphery thereof and associated respectively with each of said rings and with said end seal for accommodating said rings and said end seal during orbiting translating movement of said roller-element bearing assembly.

Accordingly to a feature of the invention, there is further provided a squeeze film damper mechanism for use with a high speed rotor comprising a rolling-element bearing assembly, an enclosure having an inner encircling wall surface, the rolling-element bearing assembly being disposed in said enclosure and with said rotor, orbitally translating therein when said rotor is rotating, and ring means engaged at the periphery thereof with the enclosure inner wall surface, said ring means further locating in slots at the periphery of said rolling-element bearing assembly, the slots having depths to allow the rolling-element bearing assembly to orbitally translate without effecting the engagement of the ring means with said enclosure inner surface, the ring means defining along the assembly an axial squeeze film region intervening the assembly and the said inner surface, the ring means having recess means at the peripheries thereof for providing that an inflow and outflow of an oil supply to the squeeze film region is controlled to prevent distortion of the pressure in the region at the inflow and outflow locations.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
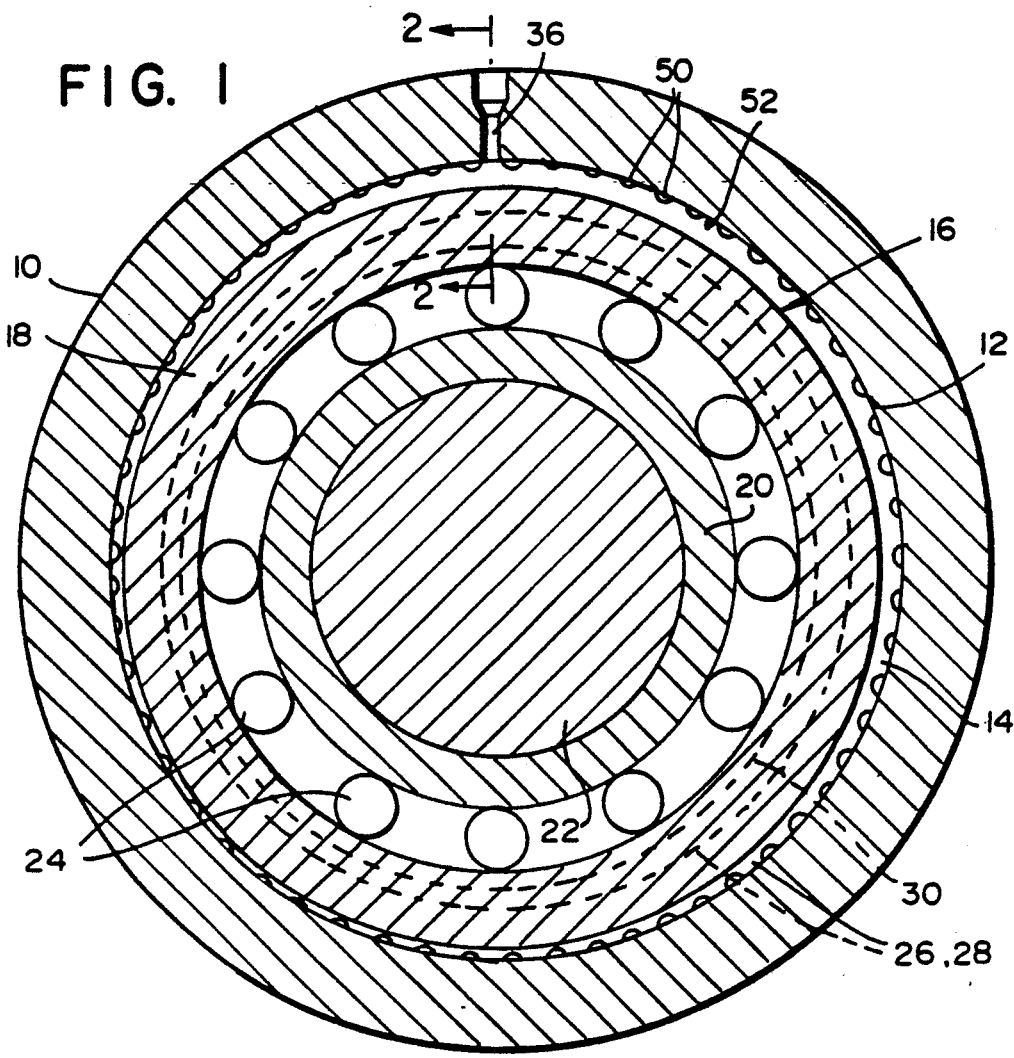
FIG. 1 is a transverse sectional view through a journal bearing enclosure in an aircraft engine showing the rolling-element bearing assembly which is disposed in that enclosure and in which the aircraft engine rotor shaft is received.
Figure 4:
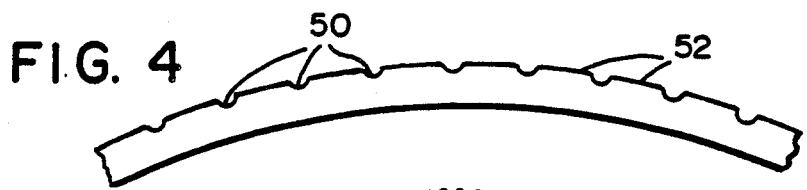
FIG. 4 is a fragmentary side view on enlarged scale illustrating the serrated rings used in the mechanism.

Referring to FIG. 1, aircraft journal bearing 10 is an enclosure structure which includes an inner encircling wall surface 12 which defines space 14 in which is disposed rolling-element bearing assembly 16. The rolling-element bearing assembly 16 includes an outer race 18, and an inner race 20 in which is received rotor shaft 22, the rotor shaft being fixed to the inner race so that the latter rotates with the shaft. Captive between the inner and outer race components is a plurality of rolling elements, roller bearings 24 being used almost exclusively in a bearing assembly of that type in the environment depicted. As one skilled in the art readily understands, when shaft 22 rotates at high speed during engine operation, that shaft does not rotate on a fixed centerline. Rather the shaft centerline moves in an orbital travel since the shaft undergoes tow-dimensional translating motion. This translating movement produces or creates vibratory energy in the system, which energy must be damped by means of a squeeze film damper, squeeze film dampers being commonly employed in aircraft turbine type engines. As the rotor rotates and translates, a fluid-film pressure is produced which opposes the load opposing the translational velocity to thus effect damping. It will be understood that the magnitude of eccentricity of the roller-element bearing assembly 16 and shaft 22 relative to inner surface 12 has been exaggerated to facilitate depiction of the placement of components in enclosure 10 as well as the motion of the assembly 16 therein.

Figure 2:
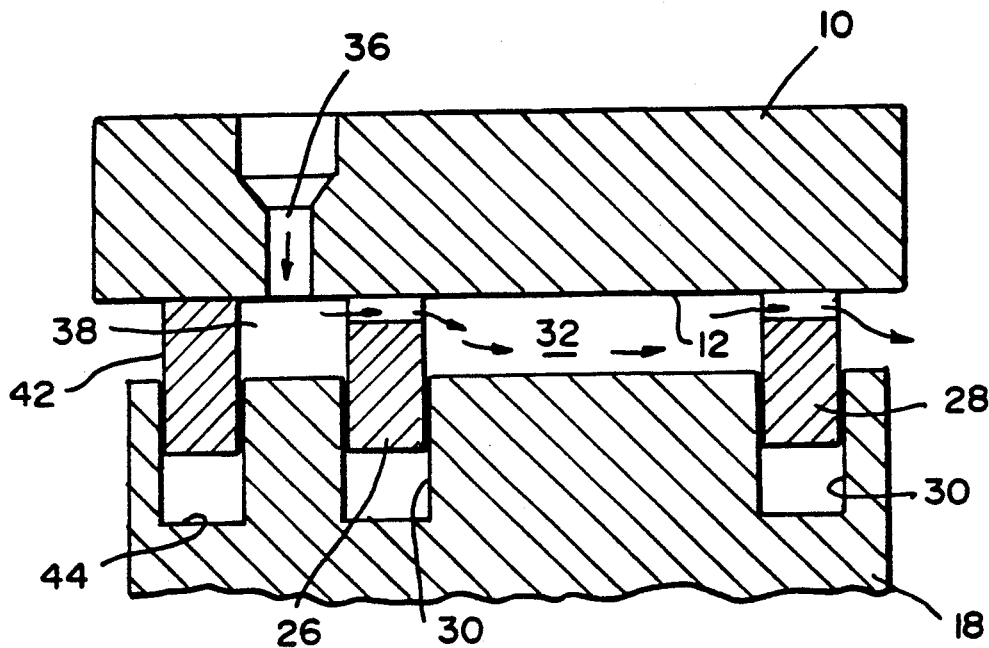
FIG. 2 is a sectional view taken along the line 2—2 in FIG. 1 showing the squeeze film feed and seal mechanism.

Referring now to FIG. 2, a pair of serrated rings 26, 28 are fixed to inner wall surface 12 and these rings surround the roller-element bearing assembly, outer race 18 being provided with annular continuous slots 30 into which the rings 26, 28 project, the depth of these slots 30 being such that rings 26, 28 will always be present in the slots regardless of where the assembly may be at any given moment of its orbital travel. The tolerance of fit between rings 26, 28 and slots 30 is not and need not be like that used in other engine applications where oil must bypass rings situate in slotted grooves and hence large tolerance of fit must be used to allow such bypass. The rings 26, 28 are spaced axially a distance one from the other and the axial space between them demarks the axial extent of a squeeze film region 32, the squeeze film region further being defined by the outer periphery of the outer race 18 and the inner wall surface 12 of journal bearing structure 10.

An oil inlet passage 36 is formed in journal bearing structure 10 and that passage opens into a feed chamber 38 located adjacent to and being defined as to one of its extremes by ring 26, the other extreme of chamber 38 being established by end seal ring 42, outer race 18 also being slotted as at 44 to receive such end seal ring. Rings 26, 28 are each provided at their outer peripheries with serrations or recesses 50 there being lands 52 intervening the successive ones of the serrations and being the ring structure part which is fixed to surface 12. The recesses can have any one of a number of shapes in addition to the arcuate or parti-circular shape shown. In this respect, rings 26, 28 can be fixed to surface 12 by any suitable means, e.g., a shrink fit, welding etc. A flow of oil delivered from a source (not shown) will enter inlet passage 36 and pass into feed chamber 38, the oil then entering the squeeze film region as a flow thereto through the serrations in ring 26, outflow through ring 28 being in the same manner. Within the squeeze film region, the fluid pressure will build up to levels as high as 500 psig as compared to feed chamber pressure of only about 40–50 psig. Flow through the serrated rings 26, 28 as compared to bypass around a ring as used in prior mechanisms, avoids pressure distortion especially at the outflow from region 38 so that maintenance of high pressure field conditions for optimized damping is assured. In prior mechanisms large ring-to-slot tolerance (as seen, for example and acceptable in this case, in the fit of seal ring 42 in slot 44) engender pressure blow out at the squeeze film region outflow point and this in turn leads to damping degradation.

Figure 5:
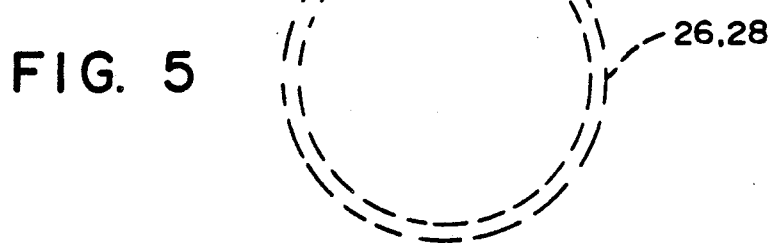
FIG. 5 is a side view on reduced scale of the ring shown in FIG. 4 showing the preferred form of ring wherein the peripheral serrations extend around the full ring circumference.

FIGS. 5 and 6 show that the serrations 50 preferably are uniformly spaced around the peripheries of rings 26, 28 and can be provided as, e.g., 72 in each ring. Use of a large number of holes in the rings 26, 28 and since they are of small size, allows that ring 26 acts as a continuous sink or source line, preventing distortion of the pressure field and assuring that large pressures are generated within the squeeze film region.

Figure 3:
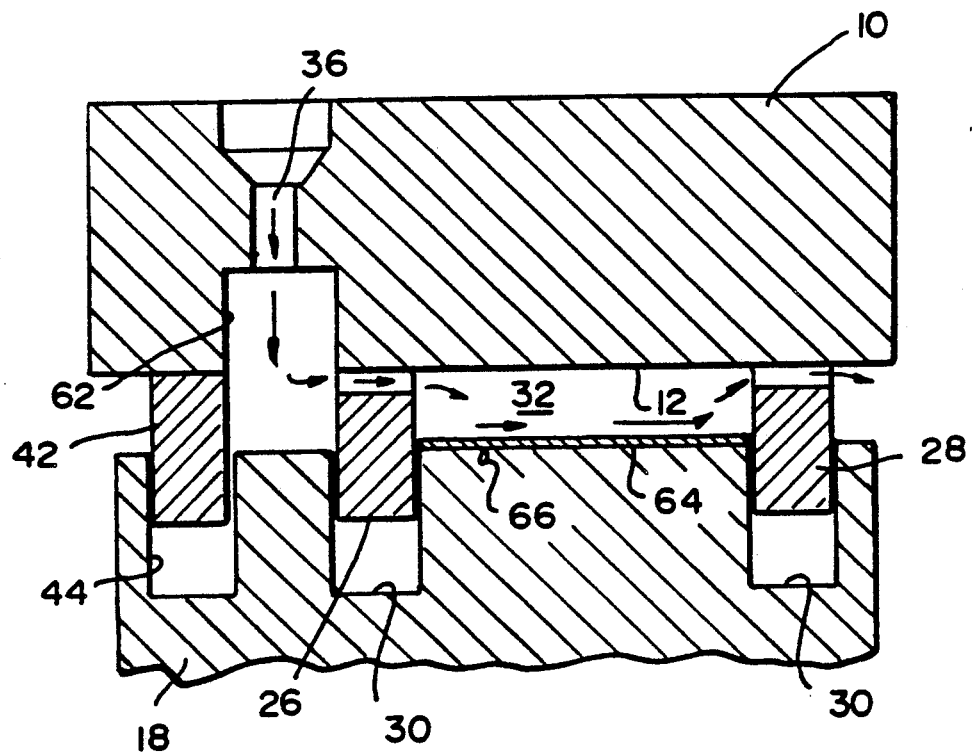
FIG. 3 is a view similar to FIG. 2 illustrating another mechanism form wherein an enlarged oil feed chamber is used.

FIG. 3 shows another form of mechanism in which the feed chamber 38 is enlarged as by formation of groove 62 in journal bearing structure 12 so that this enlarged inlet chamber area also provides damping. FIG. 3 also illustrates how the rolling-element bearing assembly can be enclosed in a cylindrical sleeve 64 so that outer race 18 can be fixed thereto as at 66 to prevent the outer race from self-rotating during its orbiting movement.

Due to use of two serrated rings 26, 28 to better control oil inflow/outflow from the squeeze film region, it is also possible to better effect with this oil flow control, dissipation of heat from the rolling-element bearing assembly.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms herein before described being merely preferred or exemplary embodiments thereof.

What is claimed is:

1. In an aircraft engine rotor system including
an enclosure having an inner encircling wall surface, and
a rolling-element bearing assembly disposed in said enclosure, said rolling-element bearing assembly receiving an aircraft rotor shaft therein, said rolling-element bearing assembly along with said rotor shaft orbitally translating within said enclosure when said rotor shaft is rotating, said enclosure having an oil inlet therein for admitting an oil flow interiorly of said enclosure for establishment of a squeeze film intervening said rolling-element bearing assembly and the enclosure inner surface, squeeze film damper feed and seal mechanism comprising
a pair of rings engaged with the inner wall surface of said enclosure and encircling said rolling-element bearing assembly, said rings being spaced one from the other a distance to define a squeeze film region therebetween at the outer peripheral surface of said rolling-element bearing assembly, one of said rings being located adjacent the enclosure oil inlet, and
an end seal engaged with said inner wall surface and encircling said rolling-element bearing assembly and spaced from said one ring such that the enclosure oil inlet is intermediate said one ring and said end seal, space between said one ring and said end seal defining an oil feed chamber,
said one ring having a plurality of recesses formed at the periphery thereof for communicating an oil flow from the feed chamber into the squeeze film region, the other of said pair of rings having a plurality of recesses formed at the periphery thereof whereby oil in the squeeze film region can outflow therefrom to an oil outlet, said rolling-element bearing assembly having continuous slots extending around the periphery thereof and associated respectively with each of said rings and with said end seal for accommodating said rings and said end seal during orbiting translating movement of said rolling-element bearing assembly.

2. The aircraft engine rotor system of claim 1 in which the recesses at the periphery of each of said one and said other ring extend around the full peripheral length of such rings.

3. The aircraft engine rotor system of claim 1 in which the recesses at the periphery of each of said one and said other ring are uniformly spaced one from the other.

4. The aircraft engine rotor system of claim 1 in which the recesses at the periphery of each of said one ring and said other ring are of arcuate profile.

5. The aircraft engine rotor system of claim 1 in which the oil inlet is a passage formed in the enclosure, the passage outletting directly into the oil feed chamber.

6. The aircraft engine rotor system of claim 1 in which the inner surface of said enclosure has an enlarged encircling groove therein and extending axially between said one ring and said oil seal, the oil inlet in said enclosure comprising a passage outletting to said groove, said groove opening to said oil feed chamber.

7. The aircraft engine rotor system of claim 1 in which the rolling-element bearing assembly includes an outer race, an inner race, and rolling bearing elements captively held between said outer and inner races.

8. The aircraft engine rotor system of claim 7 further comprising a cylindrical sleeve, the roller-element bearing assembly being received in said sleeve.

9. The aircraft engine rotor system of claim 8 in which the slots associated with said rings and said end seal are formed in said sleeve.

10. The aircraft engine rotor system of claim 9 in which the outer race is fixed to the sleeve so that neither can self rotate during orbiting movement thereof.

11. The aircraft engine rotor system of claim 7 in which the rolling elements of the bearing assembly are roller bearings.

12. Squeeze film damper mechanism for use with a high speed rotor comprising:
a rolling-element bearing assembly,
an enclosure having an inner encircling wall surface, the rolling-element bearing assembly being disposed in said enclosure and along with said rotor orbitally translating therein when said rotor is rotating, and
ring means engaged at the outer periphery thereof with the enclosure inner wall surface, said ring means further locating in slots at the periphery of said rolling-element bearing assembly, the slots having depth to allow the rolling-element bearing assembly to orbitally translate without effecting the engagement of the ring means with said enclosure inner wall surface, the ring means defining along the assembly an axial squeeze film region intervening the assembly and the said inner surface, the ring means having recess means at the peripheries thereof for providing that an inflow and outflow of an oil supply to the squeeze film region is controlled to prevent distortion of the pressure in the region at the inflow and outflow locations.

* * * * *